(No Model.) 3 Sheets—Sheet 2.
R. J. SPEARING.
SAFETY ATTACHMENT FOR CAR TRUCKS.
No. 493,661. Patented Mar. 21, 1893.
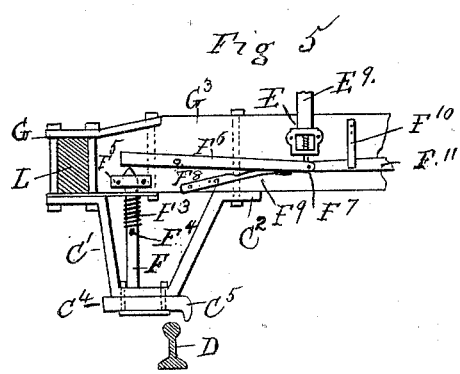
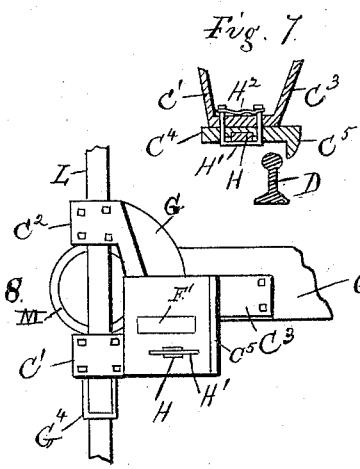
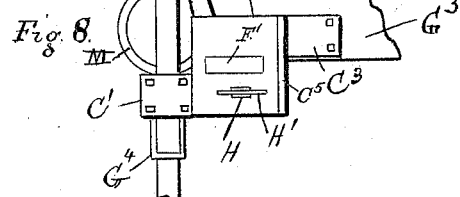
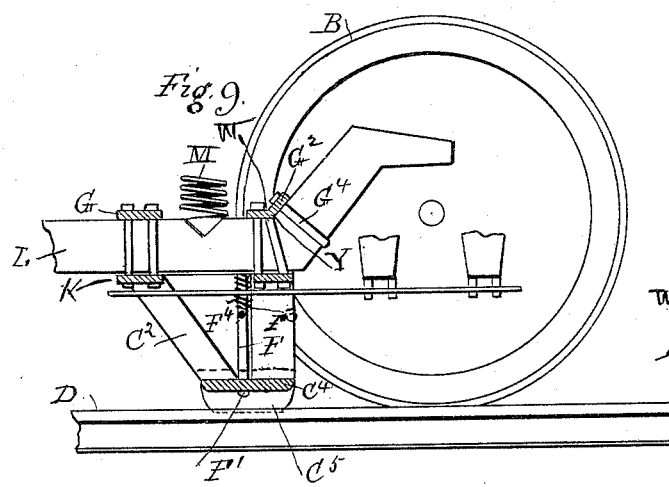
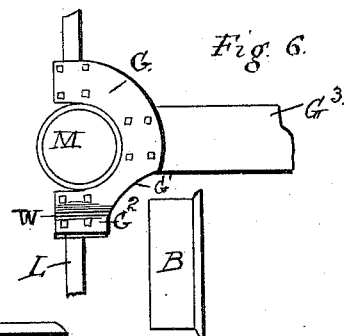
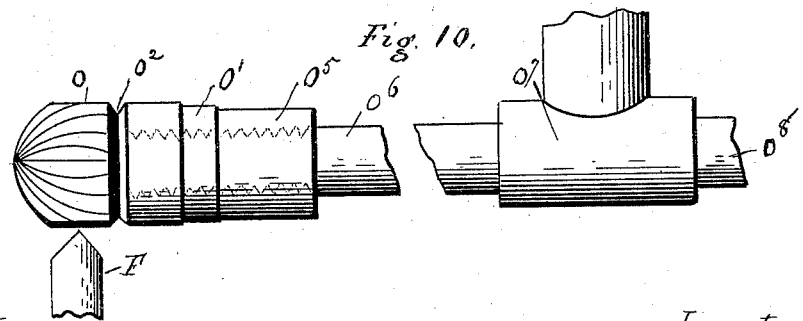
Witnesses:
Jona. B. Alley
G. M. Copenhaver
Inventor:
Robert J. Spearing,
By his Attorneys:
John J. Halsted & Son (No Model.) 3 Sheets—Sheet 3.
R. J. SPEARING.
SAFETY ATTACHMENT FOR CAR TRUCKS.

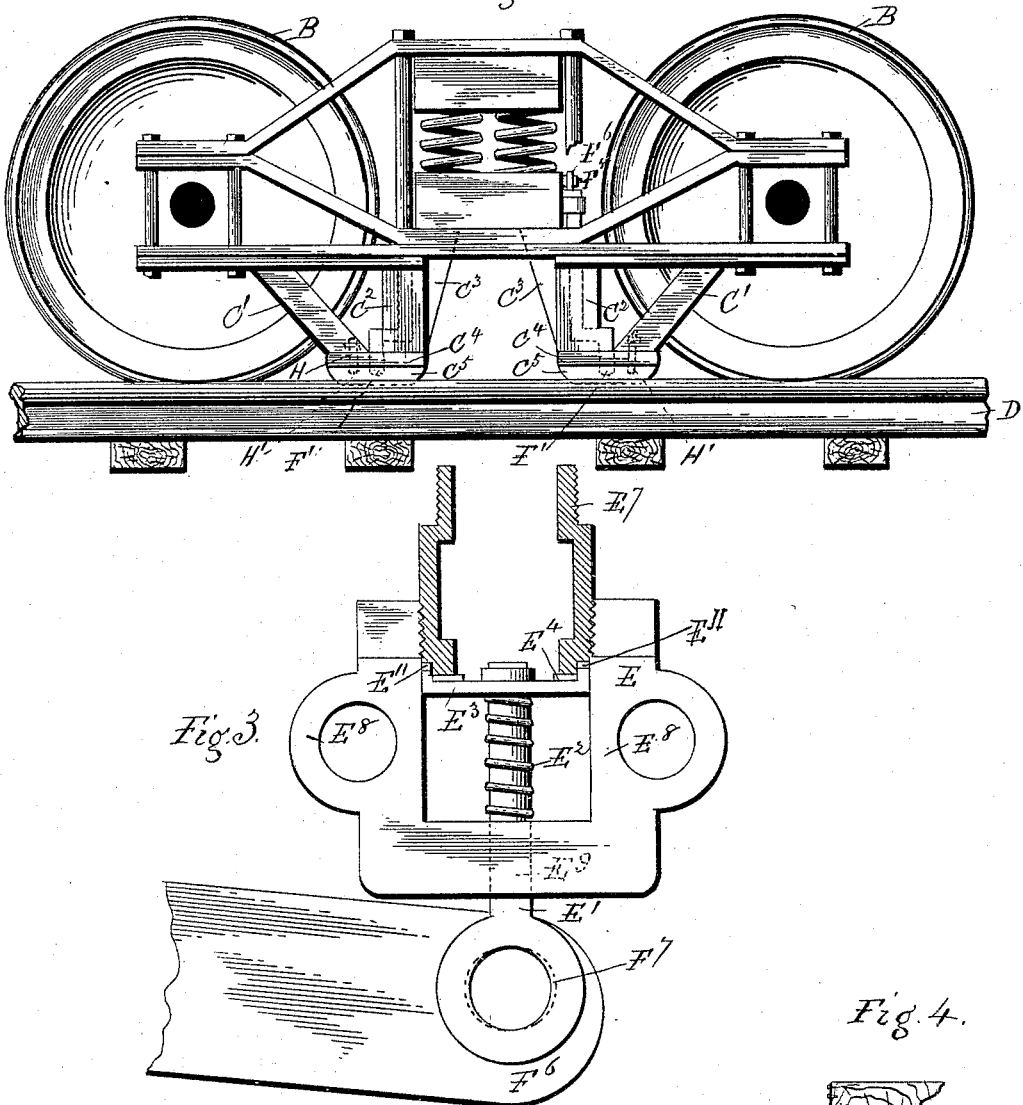
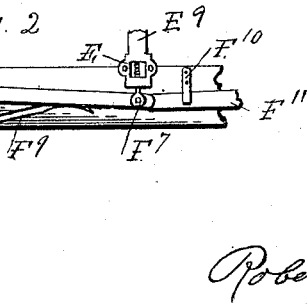

No. 493,661. Patented Mar. 21, 1893.

Witnesses

Robert J. Spearing, Inventor
by John J. Halsted & Son
his Attorneys

United States Patent Office.

ROBERT J. SPEARING, OF SHERBROOKE, CANADA.

SAFETY ATTACHMENT FOR CAR-TRUCKS.

SPECIFICATION forming part of Letters Patent No. 493,661, dated March 21, 1893.

Application filed September 24, 1890. Serial No. 365,991. (No model.)

*To all whom it may concern:*

Be it known that I, ROBERT J. SPEARING, of Sherbrooke, in the county of Sherbrooke, Province of Quebec, Dominion of Canada, have invented a new and Improved Safety Attachment for Car-Trucks, of which the following is a full, clear, and exact description.

My invention relates to improvements in safety attachments for railway passenger car trucks, and has for its object, to provide greater security against wrecking of the train in case of breaking of wheel, axle, or spreading of rails, or other like accident, and may be considered as an improvement on the United States Patent No. 443,302, granted to myself, the 23d of December, 1890. In said patent are shown safety shoes, separately attached to a freight car truck.

The improvements comprised in my present invention, relate to the shoes and to a connecting beam to which the shoe-supporting standards on opposite sides of the truck are rigidly secured, to permit of providing passenger-car trucks with combined safety shoes and a brake actuating attachment, to be carried close to the tread of each of the car wheels, and consists of certain features of construction and novel combination of parts, as will be hereinafter described and claimed.

Reference is had to the accompanying drawings, which illustrate the application of my improvements, and show them in some of the figures as applied to the Westinghouse system, in which the reduction of pressure in the train pipe causes the application of the brakes, and in other figures as applied to the vacuum system, and adapted thereto.

Figure 12:
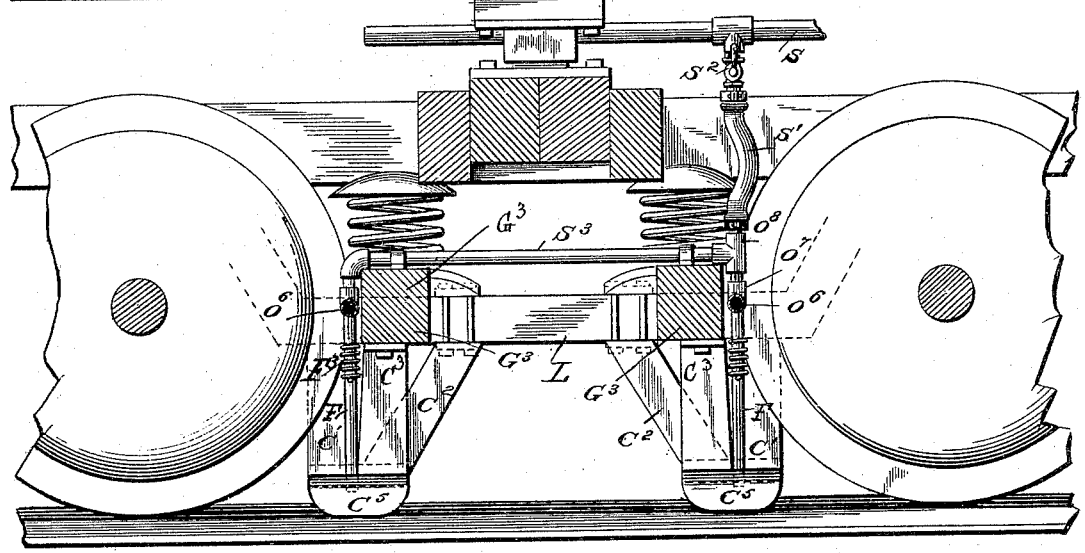
Figure 11:
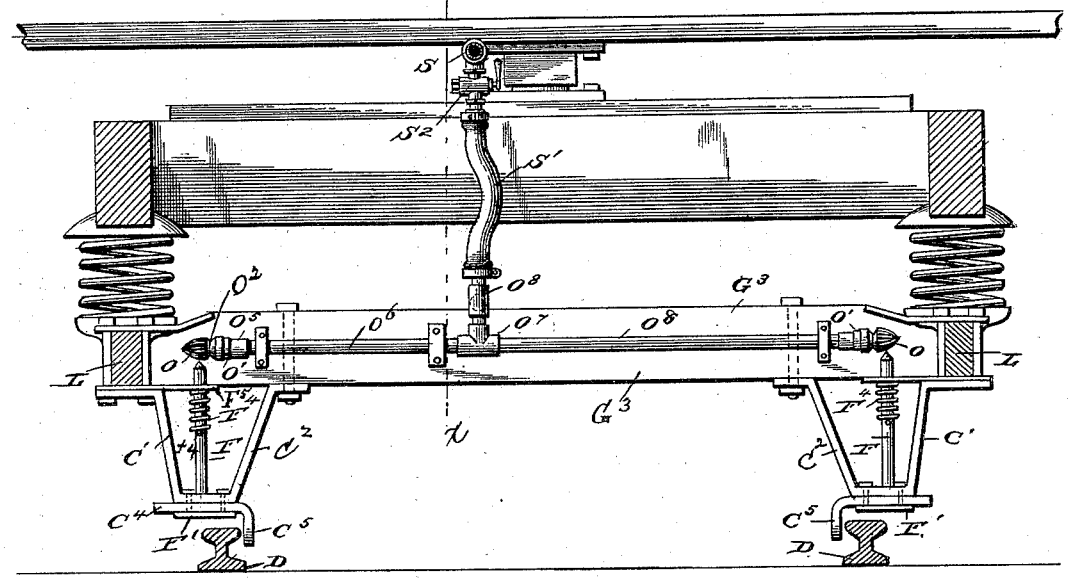

Figure 1 is a side view of a freight car truck showing one form of my safety shoe attachment, adapted and applied thereto. Fig. 2 is a view showing my safety shoe with flange and tripping rod in normal position as carried above the rail, and showing the standards as secured to the spring plank of a freight car truck, also showing how connections may be made by means of a differential lever, with a valve. Fig. 3 is an enlarged view, part sectional and part elevational, of a valve which may be used in connection with levers as shown in Fig. 2. Fig. 4 is a side view of the spring catch, adapted to hold the differential lever down and valve open. Fig. 5 is a side view showing part of the safety shoe beam that connects the opposite shoes rigidly together, and attached to the equalizing bar of a passenger car truck, showing also end of branch pipe, valve, differential lever and tripping rod and safety shoe standards, connected to the safety beam, and anchor plates. Fig. 6 is a top plan view of anchor plate, of the safety shoe beam shaped to provide wheel space and as secured to equalizing bar. Fig. 7 is a vertical section through the shoe showing improved manner of attaching a torpedo in a shoe by means of U bar and elliptic spring, to hold it up in position. Fig. 8 is a bottom plan view of safety shoe, showing connections with and relative of the safety shoe beam and equalizing bar of passenger car truck, showing also the aperture centrally located in the shoe for the tripping rod, and location of torpedo. Fig. 9 is a side view of a part of a passenger car truck, showing my device as adapted and attached thereto, showing the location of the anchor plates which secure the safety shoe beam to the equalizing bar of the car truck, as shown in other views, Figs. 5, 6 and 8; showing also standards of the shoe formed to connect with anchor plates and equalizing bar. Fig. 10 is an enlarged view of the end of a branch pipe and safety cap thereon. Fig. 11 is a cross section of part of a car truck, showing in elevation, the safety shoe beam, and arrangements of branch pipes, and safety cap over tripping rod. Fig. 12 is a longitudinal sectional view of the same in the line X X of Fig. 11.

It is evident that in order to support upon and by means of a shoe, the load of any wheel that may be disabled, it is desirable to locate the shoe as close as possible to the rails and to the tread of the wheel.

As heretofore constructed, safety shoes were not adapted to support the load in case of accidents, and were not provided with means of being attached to parts of the passenger truck by which they would be carried at a uniform height from the rail, and very close thereto. I have devised a safety-shoe-beam, and means for connecting rigidly together by this beam the opposite shoes, such beam in case of the breaking of a wheel &c. taking the place of the axle of the car wheels, to support the car, and also holding the flanges of the opposite shoes in the path of the flanges of the opposite car wheels. For the purpose of locating my safety shoe as closely as possible to the base of each of the truck wheels, and also to obtain a secure fastening to the safety-shoe-beam of two safety shoes, located on opposite sides of a car, and of uniting these all into one firm strong structure or truss, I have devised the lower plate K, which is preferably made with or secured to the bottom of the safety beam $G^3$. The strong standards $C'$ and $C^2$ of the shoe $C^4$ are first strongly secured to this beam, after which the beam, with the shoes so attached, is placed in position shown on the equalizing bars, and the anchor plate G, provided at the one with an angle W, made to fit the equalizing bar at the angle Y, is placed and secured on top of the safety beam, and the other end of the plate G is made to fit around to the other side of the truck spring M where it is secured by a bolt or bolts to the equalizing bar L and to the lower plate K and standards $C^2$ of the shoe. By means of the U bar $G^4$, the anchor plates, beam and shoe, are held firmly in place, and prevented from sliding forward or backward along the equalizing bar, away from the wheel.

Although I have described the safety shoe standards, plate K, and safety beam, as separate pieces, they are preferably made in one piece of steel cast to fit the respective height and proportion of the tracks to which they are to be applied. The anchor plate G, however is made separately, and applied and secured in place on top of the beam and equalizing bar, after the shoe has been put in place. The opposite shoes so connected to the beam, are therefore made ready to be applied quickly to the truck, and this beam and its shoes, shoe standards and anchor plates form a very strong and reliable safety truss.

In Fig. 6, I show the way in which I shape the anchor plate G, I reduce the width of this plate, and increase its thickness or instead have its edge turned down, to provide the strength required. The shape of the standards, may of course be made to suit the construction of different kinds of trucks, and as shown in Figs. 2 and 5, where the inner standard $C^2$ is shown as made in one piece with one of the outer standards. In Figs. 1 and 2, the standards $C'$, $C^2$ and $C^3$ are shown, adapted to attach the shoe $C^4$ to a freight car truck, and are in this connection, slightly modified for that purpose; and as in Fig. 1 the standards $C'$ and $C^2$ are shown with the strip C, which is bolted to the truck.

In the construction described, the anchor plate G, U shaped bar $G^4$, the lower pla e K, in connection with a safety beam $G^3$, and the equalizing bar and the shoe standards, form a substantial combined structure and a secure conjoint connection, whereby I am enabled to apply my safety shoe $C^4$, having a flange extending down below the top of the rails, to a passenger car truck, and hold the flanges of the shoe $C^4$, at the gage of and in line with the flanges of the car wheels. In case of accident, when the shoe comes upon the rail, and the weight which was previously carried by the disabled wheel, comes upon the shoe, the strain upon the parts is very severe the safety shoe beam having now to perform the duty which previous accident devolved on the axle of the car wheel.

In case of the breaking of a wheel-flange or wheel, axle, journal, or like accident, the shoe $C^4$ will carry its flange $C^5$ farther down below the top of the rail and guide the truck along the rails over switch rails, frogs, and off the main line on to sidings to leave the main line clear thereby avoiding the interruption of traffic, and preventing collision by other trains.

In combination with the safety attachment described, I have devised a brake actuating attachment shown in Figs. 10, 11 and 12, and other figures, whereby I extend the air brake system from the main air brake pipe of the train to branches carried on my safety shoe beam, and arranged to open the branch air pipes by means of the direct action of a device suspended from the safety shoe beam. From any convenient point on the main air brake pipe, I connect one end of a flexible pipe $S'$, at the other end of which I make connection with the branch pipes carried on the safety shoe beam, and extending to points directly over each of the tripping rods F. The end of each of the branch pipes is securely closed by a metallic safety cap O, provided with a screw thread by which it is made secure on the branch pipe $O^6$, which pipe has a corresponding screw thread, and collar $O^5$ screwed or secured thereon, to provide a seat for the rubber washer $O'$, used to make the connection absolutely air-tight. The safety cap O is reduced in thickness and weakened by a groove cut around it at $O^2$. The branch pipes $O^6$ and $O^8$ are firmly secured to the safety shoe beam.

The tripping rod F, shown in Figs. 9 and 11, is suspended from the guide $F^5$, secured on the safety shoe beam, and has its lower T-shaped end suspended in an elongated aperture, formed for that purpose, in the shoe $C^4$, close to and at right angles to the rail and close to the tread of the wheel. This T-shaped end practically closes such aperture and prevents the lodgment of dirt and obstacles therein. To prevent the tripping rod from being needlessly moved upward by contact with minor obstacles and thereby cause the setting of the brakes when not desired, I employ a sufficiently strong spring $F^3$, on the rod between the guide $F^5$, and the pin $F^4$ under the guide, on the tripping rod. The top end of my tripping rod is held in its normal position against the safety cap O, and against lateral displacement by means of the guide $F^5$, and the cap being firmly held in place on the safety shoe beam, a very slight upward movement of the tripping rod would be certain to remove the cap and cause the setting of the brakes.

In order to release the brakes after an accident has occurred, a stop cock $S^2$ is inserted in the branch, close to the main pipe. By this means all the branches on any truck may be cut out, whenever desired.

It will be understood that my device may be readily attached to a locomotive or tender by very slight changes in the construction shown and described. I do not limit myself to the precise arrangements of the parts shown, as the same may be obviously varied without departing from the spirit of my invention.

Although I prefer to have the branch pipes securely closed by a safety cap, as described, and to effect the opening of the pipes by removal of such cap by the direct movement of the tripping rod, I have devised and shown in Figs. 2 and 5, means of reducing the movement of the tripping rod necessary to effect the opening of the air pipes in connection with valve, the differential lever $F^6$, which is pivoted at $F^8$, having its shorter arm over the tripping rod, and the longer arm connected with a valve, as at E, in the branch air pipe $E^9$.

In the place of the valve E shown, a safety cap might be employed to close the branch pipe and arranged to be removed by the lever.

The branch pipes described may terminate in the valve E, such as shown in Fig. 3, and be located as shown in Figs. 2 and 5, which is arranged to be operated by the differential lever $F^6$, pivoted at $F^8$, and in position to be moved by the tripping rod F,—the levers $F^6$ and $F^{11}$ are connected with the valve rod $E'$ at $F^7$; elliptic spring $F^9$, Figs. 2 and 5, hold the levers up and the valve securely closed. The spring $F^{10}$ when in normal position, rests on the side of the lever $F^{11}$, shown in Fig. 4, and located as shown in Figs. 2 and 5. In case of accident, when the end of lever moves downward, the spring $F^{10}$ moves inward on top of the lever, thereby holding the valve open. The valve disk, $E^3$, is pressed firmly against the rubber washers $E^4$, and $E^{11}$, by the spiral spring $E^2$, and the elliptic spring $F^9$, making the valve air tight. The perforated projections are provided at $E^8$, to secure the valve in position. The valve stem $E'$ is guided by the opening $E^9$, the whole as shown in Figs. 2, 3 and 5.

In Fig. 7 is shown a U shaped bar $H'$, and spring $H^2$, devised to securely hold a torpedo in place in the face of the shoe. After the torpedo has been exploded, the spring $H^2$ will lift the face of the bar $H'$ up into the recess formed therefor in the face of the shoe.

I would here state that mere iron rods extending across a car truck, whether connected to the equalizing bars or not, cannot possibly perform the duties of my cross-beams $G^3$, because they could not properly support the branch air pipes, nor firmly support the shoe-standards, nor be properly connected thereto, nor to the equalizing bars, nor to an anchor plate such as I have described; nor in any wise serve as an element in the constitution of such a combined, strong truss as I have shown and described.

I do not in this application make any claim for the pneumatic pipes or brakes connected therewith, but confine my present claims to the special safety attachments described, whereby in case of accidents as hereinabove mentioned, there is afforded greater security against wrecking a train and loss of life.

I claim—

1. In combination with the two opposite equalizing-bars the stout safety cross-beams, each firmly secured to the ends of such bars, the strong standards $C'$, $C^2$, serving to uphold the said beams and equalizing bars, and carrying the shoes severally provided with a flange $C^5$, all as and for the purposes set forth.

2. In combination, the two opposite equalizing-bars, the stout safety cross-beams, the anchor plates G, fastened to the angles of the equalizing-bars and to said cross-beams, the standards $C'$, $C^2$ serving to uphold said beams and bars, and also provided with the flanged shoes, all as and for the purposes set forth.

3. In combination, the two opposite equalizing-bars, the stout cross-beams, the anchor plates G, serving to fasten firmly together such bars and beams, and the standards $C'$, $C^2$, firmly secured to such bars and beams, and carrying the broad flanged shoes, extending cross-wise of the track-rails, and provided with a transverse aperture adapted for a tripping rod of a brake attachment, all substantially as set forth.

4. In combination with the cross-beams $G^3$, the equalizing bars, the anchor plates G, and with the apertured shoes and their standards or supports, eyes or supports on the beam suitable for securing to such beam a pipe or branch pipe of an air brake system, all substantially as set forth.

5. In combination, with the safety cross-beam $G^3$, and with the equalizing bars L, the anchor plates G, secured to the upper side of said bars, extended around the truck-springs, and having each an upturned end to fit the angle of the equalizing-bar and the reduced width as at $G'$, to clear the wheels, for the purpose set forth.

6. In combination, the cross-beams $G^3$, equalizing bars, these jointly serving to support the flanged safety shoes and their standards, and the anchor plates G, made and fitted to such bars and beams as described, and the U-shaped bars $G^4$ and under plate K, all substantially as set forth.

ROBERT J. SPEARING.

Witnesses:
 GEO. MORIN,
 N. H. GREENE.